(12) United States Patent
Jäger et al.

(10) Patent No.: US 10,183,807 B2
(45) Date of Patent: Jan. 22, 2019

(54) CAMBELT, IN PARTICULAR A CAMBELT SUITABLE FOR AGRICULTURAL MACHINERY

(71) Applicant: Arnold Jäger Holding GmbH, Hannover (DE)

(72) Inventors: Sebastian Jäger, Hannover (DE); Nick Schmidt, Lehrte/Immensen (DE)

(73) Assignee: Arnold Jäger Holding GmbH, Hannover (DE)

( * ) Notice: Subject to any disclaimer, the term of this patent is extended or adjusted under 35 U.S.C. 154(b) by 0 days.

(21) Appl. No.: 15/299,127

(22) Filed: Oct. 20, 2016

(65) Prior Publication Data
US 2017/0113876 A1  Apr. 27, 2017

(30) Foreign Application Priority Data
Oct. 23, 2015  (DE) .......................... 10 2015 118 143

(51) Int. Cl.
*B65G 15/52*  (2006.01)
*B65G 19/24*  (2006.01)
(Continued)

(52) U.S. Cl.
CPC ........... *B65G 15/52* (2013.01); *A01D 61/008* (2013.01); *A01D 61/02* (2013.01); *B65G 15/12* (2013.01);
(Continued)

(58) Field of Classification Search
CPC ........ B65G 15/12; B65G 15/42; B65G 15/44; B65G 15/52; B65G 19/24; B65G 17/42;
(Continued)

(56) References Cited

U.S. PATENT DOCUMENTS 1,094,191 A * 4/1914 Bartosz .................. B65G 15/42
  198/699
2,137,713 A * 11/1938 Conner .................. B65G 15/42
  198/699
(Continued)

FOREIGN PATENT DOCUMENTS

AT  346 767  1/1977
DE  1 831 012  5/1961
(Continued)

OTHER PUBLICATIONS

Office Action dated Jul. 28, 2017 in German Priority Application No. DE 10 2015 118 143.6, filed on Oct. 23, 2015 (6 pages).
(Continued)

*Primary Examiner* — Gene O Crawford
*Assistant Examiner* — Keith R Campbell
(74) *Attorney, Agent, or Firm* — Shlesinger, Arkwright & Garvey LLP

(57) ABSTRACT

Cam belt, particularly for agricultural machinery, produced from a polymer provided with reinforcement inserts, has cams on the inner side of the cam belt that are used to drive cam belt. A first flank faces in the running direction of cam belt and a second flank faces in opposite direction. Cams are spaced apart from one another by gaps in a predefined division, and gaps are delimited by first flank and second flank of two adjoining cams and a base which connects two flanks. During operation of cam belt carrier of a cam wheel resting against second flank of one of adjoining cams and against the base of a gap engage with the gaps. On outer side of belt, functional elements are fixed by a fastener which from inner side of the belt passes through the cam belt and the functional elements via at least one through hole.

9 Claims, 4 Drawing Sheets

(51) Int. Cl.
*A01D 61/00* (2006.01)
*A01D 61/02* (2006.01)
*B65G 17/42* (2006.01)
*B65G 15/42* (2006.01)
*B65G 15/44* (2006.01)
*B65G 19/10* (2006.01)
*B65G 15/12* (2006.01)
*A01D 17/10* (2006.01)

(52) U.S. Cl.
CPC ............. *B65G 15/42* (2013.01); *B65G 15/44* (2013.01); *B65G 17/42* (2013.01); *B65G 19/10* (2013.01); *B65G 19/24* (2013.01); *A01D 2017/103* (2013.01)

(58) Field of Classification Search
CPC ...... B65G 23/06; B65G 19/10; A01D 61/008; A01D 61/02; A01D 2017/103
See application file for complete search history.

(56) References Cited

U.S. PATENT DOCUMENTS

| | | | | |
|---|---|---|---|---|
| 2,211,648 A | * | 8/1940 | Currie | B65G 15/42 198/699 |
| 2,273,627 A | * | 2/1942 | Currie | B65G 15/42 198/699 |
| 4,023,671 A | * | 5/1977 | Kramer | F16G 3/08 198/699 |
| 4,697,693 A | | 10/1987 | Rajala et al. | |
| 4,865,182 A | * | 9/1989 | Nolte | B65G 15/42 198/698 |
| 8,528,726 B2 | * | 9/2013 | Monti | B65G 15/44 198/698 |
| 8,596,447 B2 | * | 12/2013 | Gentz | A01D 61/008 198/731 |
| 9,033,138 B2 | | 5/2015 | Mulder | |
| 9,033,139 B2 | | 5/2015 | Mulder | |
| 9,788,489 B2 | | 10/2017 | Jager | |
| 9,814,182 B2 | | 11/2017 | Mulder | |
| 2012/0186949 A1 | | 7/2012 | Gentz | |

FOREIGN PATENT DOCUMENTS

| | | | | |
|---|---|---|---|---|
| DE | 3441605 | | 11/1984 | |
| DE | 10 2007 049 839 B3 | | 6/2009 | |
| DE | 10 2009 036 104 | | 2/2011 | |
| DE | 102013109579 A1 | * | 3/2015 | ........... A01D 61/008 |
| EP | 1 854 747 | | 4/2007 | |
| EP | 2 813 135 | | 6/2014 | |
| WO | WO 2013 174371 | | 11/2013 | |

OTHER PUBLICATIONS

European Office Action dated Feb. 15, 2017 in counterpart European Application No. EP 16194067.1, filed on Oct. 16, 2016 (6 pages).

* cited by examiner

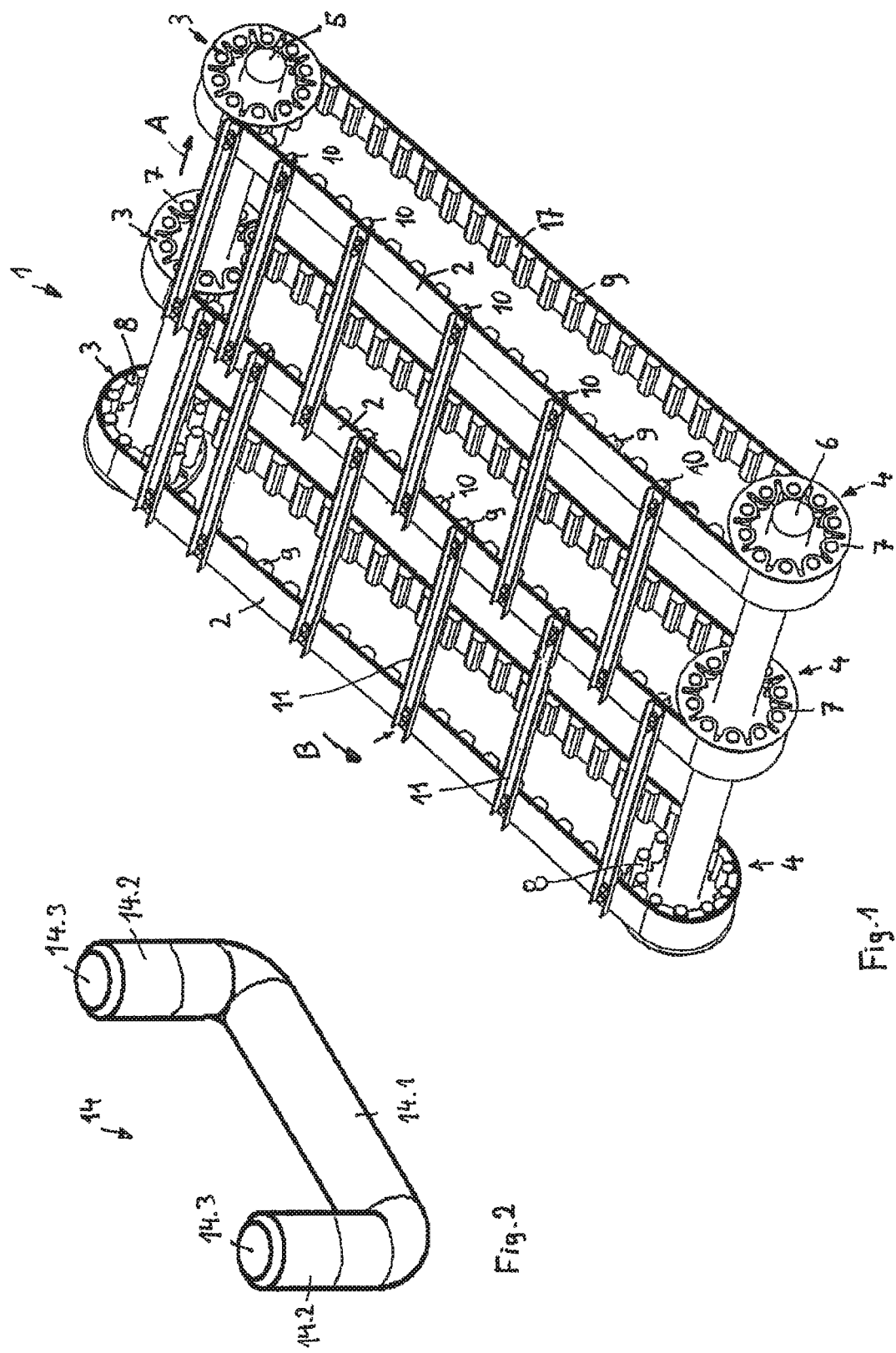

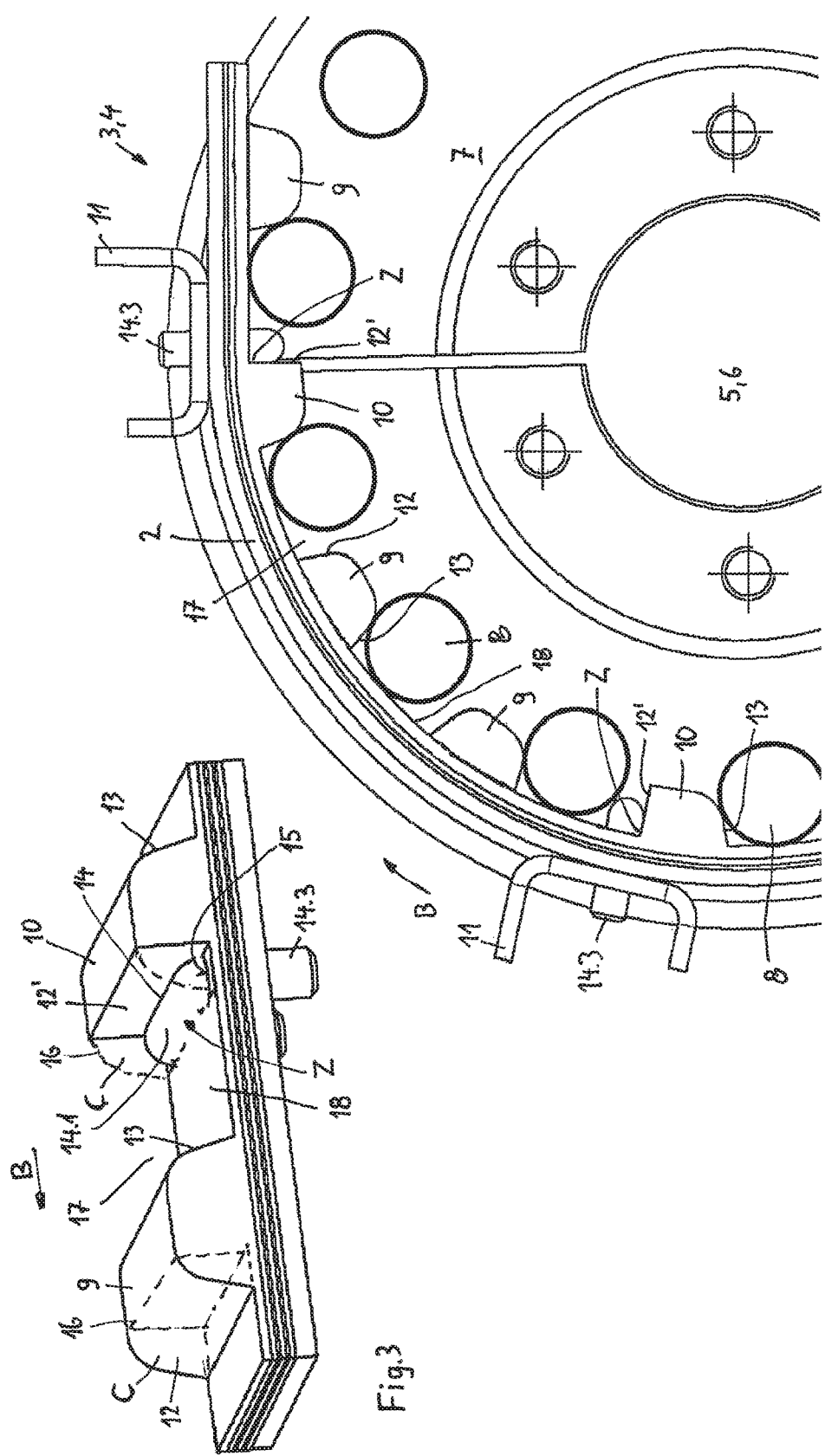

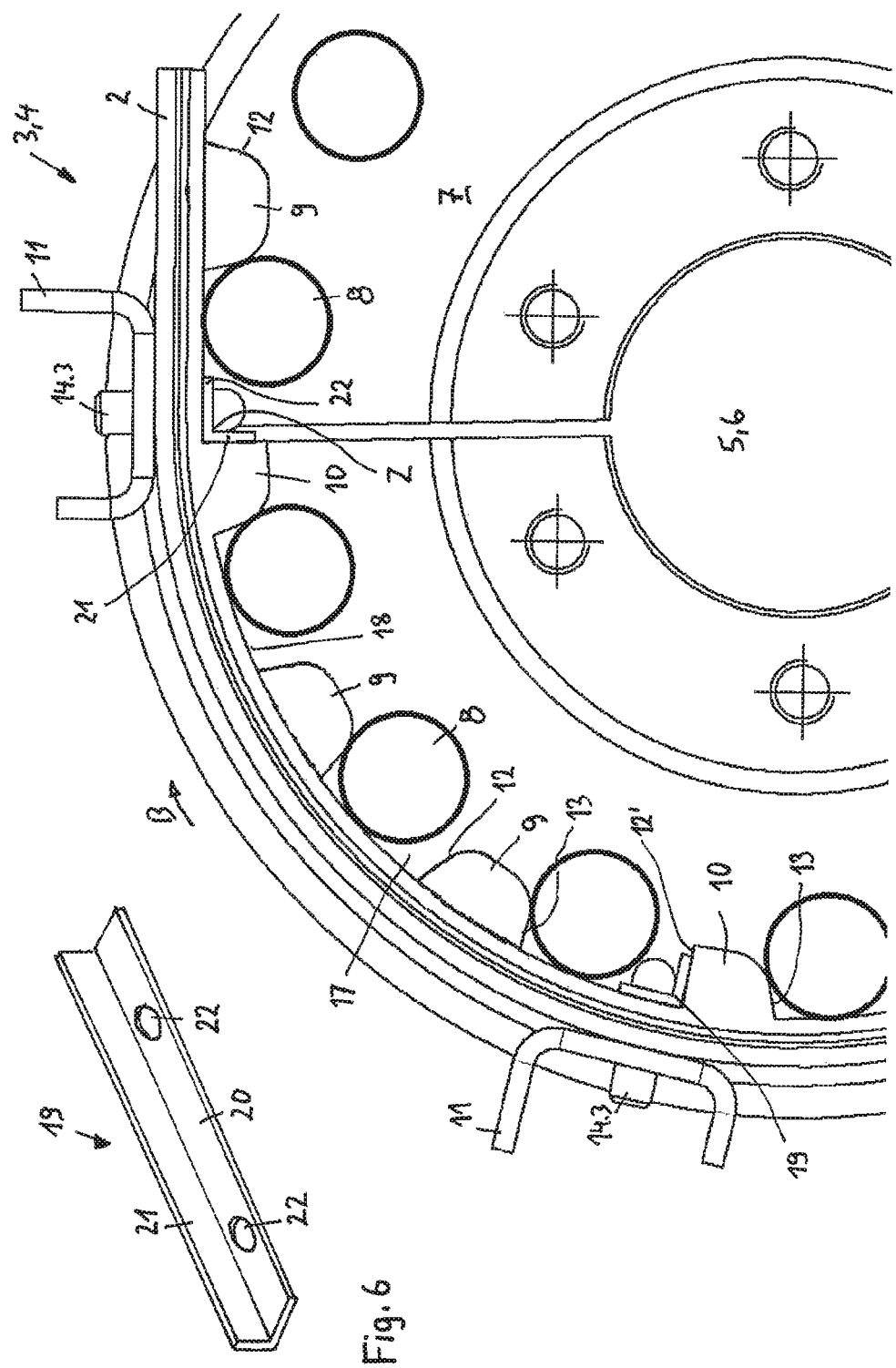

CAMBELT, IN PARTICULAR A CAMBELT SUITABLE FOR AGRICULTURAL MACHINERY

CROSS-REFERENCE TO RELATED APPLICATIONS

This application claims the priority of German Application No. 10 2015 118 143.6, filed Oct. 23, 2015, which is incorporated herein by reference.

FIELD OF THE INVENTION

The present invention relates to a cam belt. In particular, this invention relates to a cam belt suitable for agricultural machinery.

BACKGROUND OF THE INVENTION

The present invention relates to a cam belt, in particular for agricultural machinery.

Conveyor belts which have cam belts as traction means are frequently used, in particular in the field of agriculture. These types of conveyor belts usually have two or more cam belts which run in parallel to one another and are connected to one another by functional elements, for example carriers. On their inner side, the cams belts have evenly interspaced cams which are separated by gaps and which in each case circulate around a driven cam wheel and a carried cam wheel. On their periphery the cam wheels have carrier means spaced apart from one another by a distance that corresponds to the division of the cams. These carrier means engage with gaps in the cam belts which are present between the cams, thus enabling a non-slip drive. The cams belts are generally produced from crosslinked polymer reinforced by fabric plies. Other reinforcement inserts such as cord or steel cable are also known.

DE 10 2007 049 839 B3 describes a rod belt for rod belt conveyors. Two cam belts circulating in parallel to one another and connected to one another by rods extending transversely with respect to the conveying direction are provided as belts. The rods are flattened at their ends, and with these ends rest on the cam belt from above. The rods are fastened to the cam belts by riveting. For this purpose, the cam belts have two punched-out holes situated at a distance from one another, transversely with respect to the conveying direction. Likewise, two holes having the same spacing are provided in the rod ends. For establishing a riveted connection between the rods and the cam belts, the rods are placed on the cam belts in such a way that their holes align with one another. Rivets are then inserted from the underside of the belt, through the aligned holes in the rods and cam belts, with insertion of a large-surface rivet plate in between, and a closing head is produced. The rods are then fixedly connected to the cam belts. The large-surface rivet plate prevents the rivets from being pulled through the cam belt when the riveted connection is being established, or under load during operation.

In the above-described approach, the rivet plates rest centrally on the base of gaps that are formed between the cams. Circulation of the cam belt around a driven cam wheel then results in metal-to-metal contact between the outer surfaces of the carrier means of the cam wheel and the rivet plates. The generally large radial forces on the deflection points and the customary conveying speeds of 0.5 to 8 m/s, as well as the mechanical contact in conjunction with abrasive materials such as soil, dirt, and harvested crop, over the long-term result in a high level of wear on surfaces of the carrier means and of rivet plates which come into contact. This causes a reduction in the reference diameters over time, resulting in increasingly larger differences with respect to the cam division of the cam belt, which adversely affects the intermeshing of the system. In addition, this results in considerable running noise due to the contact between the carrier means of the cam wheels and the rivet plates. If the wear continues until the rivet head is worn down, the functional element detaches from the cam belt, which may result in failure of the entire system.

These disadvantages are avoided with a cam belt that is disclosed in DE 10 2009 036 104 A1. In one embodiment, carrier strips are fixed to the cam belt by screw connections. The screw connections have screw bolts which are centrally vulcanized into a cam of the cam belt. In the process, the heads of the screw bolts are embedded in the cam, and their threaded shanks protrude through a hole in the belt and through a hole in the carrier strips. The carrier strips are fastened to the cam belt by screwing a nut onto the threaded shank of the screw bolt. To be able to absorb the tensile forces which thus act on the head of the screw bolts without damaging the cam belt, in particular to prevent the screw bolt from being pulled through the cam belt, the bolt head rests on a large-surface support element in the form of an anchor plate. It is also known from this publication to weld the screw bolts onto the anchor plate, as the result of which bolt heads may be dispensed with.

That described cam belt of this type operates with low wear and low noise, since the fastening means are vulcanized into a cam. One disadvantage is that vulcanization of the fastening means is relatively complicated.

A cam belt of this type is likewise described in U.S. Pat. No. 4,697,693. For fastening a functional element, such as a carrier strip, to the cam belt, a central through hole is introduced into a cam, and a screw bolt is inserted through the through hole. The carrier strips are fastened to the cam belt by screwing a nut to the threaded shank of the screw bolt. Here as well, the head of the screw bolt rests on an anchor plate to prevent the screw bolt from being pulled through the cam belt. To prevent the head of the screw bolt and the anchor plate from protruding vertically beyond the contour of a customary cam, the height of the cam is correspondingly reduced. The radial extensions of the anchor plate and of the head of the screw bolt are selected in such a way that they are situated within the contour of a customary cam. In this approach, vulcanization of the fastening means into the cam is dispensed with. Here as well, however, metal-to-metal contact between the drive means and the fastening means is not avoided.

OBJECTS AND SUMMARY OF THE INVENTION

An object of the present invention, therefore, is to provide a cam belt of this type having low wear and low noise, with simple installation of the fastening means.

This object is achieved according to the invention with a cam belt having the features described below.

A cam belt, in particular for agricultural machinery, produced from a polymer provided with reinforcement inserts, and having cams, situated on the inner side of the belt, that are used to drive the cam belt, and a first flank facing in the running direction of the cam belt and a second flank facing in the opposite direction, wherein the cams are spaced apart from one another by gaps in a predefined division, and the gaps in each case are delimited by the first flank and the second flank of two adjoining cams, and a base which connects the two flanks, and during operation of the cam belt, the carrier means of a cam wheel, resting against the second flank of one of the adjoining cams and against the base of a gap, engage with the gaps, wherein on the outer side of the belt, functional elements are fixed by a fastening means which from the inner side of the belt passes through the cam belt and the functional elements via at least one through hole, and the fastening means is situated in the interstitial area between the first flank of the other of the two adjoining cams and the base of the gap.

The present invention makes use of the finding that in the interstitial area between the base of a gap and the flank of an adjoining cam facing in the running direction, a space is generally present which is not affected by the carrier means of a cam wheel that engages with the gap. This space is utilized for situating the functional elements, for example screws or rivets, at that location. Since contact of the fastening means with the carrier means of the cam wheels of the conveyor is avoided by this approach, the cam belt is driven with low wear and low noise, with simple installation of the fastening means. If the space in the interstitial area is not sufficient in the event of small divisions, this may be easily remedied by shifting the flank facing in the running direction in order to enlarge the gap opposite the running direction, thus providing more space for situating a fastening means in the interstitial area.

In one advantageous embodiment of the invention, the fastening means is a one-piece, U-shaped bracket made of rod steel. It has a base which in the installed state forms a support element of the fastening means on the cam belt. Two legs which are provided with a thread and are spaced apart from one another protrude perpendicularly from the base. This fastening means is easily manufacturable at low cost, and has the additional advantage that, with regard to its installed position, it has a narrow design in the longitudinal direction of the belt and thus takes up little space in the interstitial area.

Further advantageous embodiments of the invention result from the following:

The present invention further encompasses cam belts, wherein in the event of a small division, the first flank is shifted opposite the running direction in order to enlarge the gap.

The present invention further encompasses cam belts, wherein the fastening means is installed in the interstitial area, with an angle plate inserted in between which has a first cheek that is supported on the base of a gap and a second cheek that is supported on the first flank.

The present invention further encompasses cam belts, wherein the fastening means is configured as a one-piece, U-shaped bracket made of rod steel, having a base which forms a support element and from which two legs, provided with a thread, protrude perpendicularly, and which during installation are inserted through through holes that are introduced in the cam belt.

Relative terms such as left, right, up, and down are for convenience only and are not intended to be limiting.

BRIEF DESCRIPTION OF THE DRAWINGS

The invention is explained in greater detail below with reference to exemplary embodiments. The associated drawings show the following:

FIG. 1 shows a perspective oblique top of a view of an inclined conveyor of a combine harvester, FIG. 2 shows a perspective illustration of a fastening means for attaching functional elements to the cam belt of the inclined conveyor, in enlarged scale, FIG. 3 shows a perspective illustration of a section of a cam belt according to a first embodiment, having a cam that is provided for arrangement of the fastening means, FIG. 4 shows a view, in the direction of the arrow A according to FIG. 1, of a driven cam wheel of the inclined conveyor, with a section of the cam belt according to the first embodiment revolving around this cam wheel, FIG. 5 shows an illustration according to FIG. 4 with a cam belt in a second embodiment, FIG. 6 shows a perspective illustration of an angle plate used in the embodiment according to FIG. 5.

DETAILED DESCRIPTION OF THE INVENTION

Figure 7:
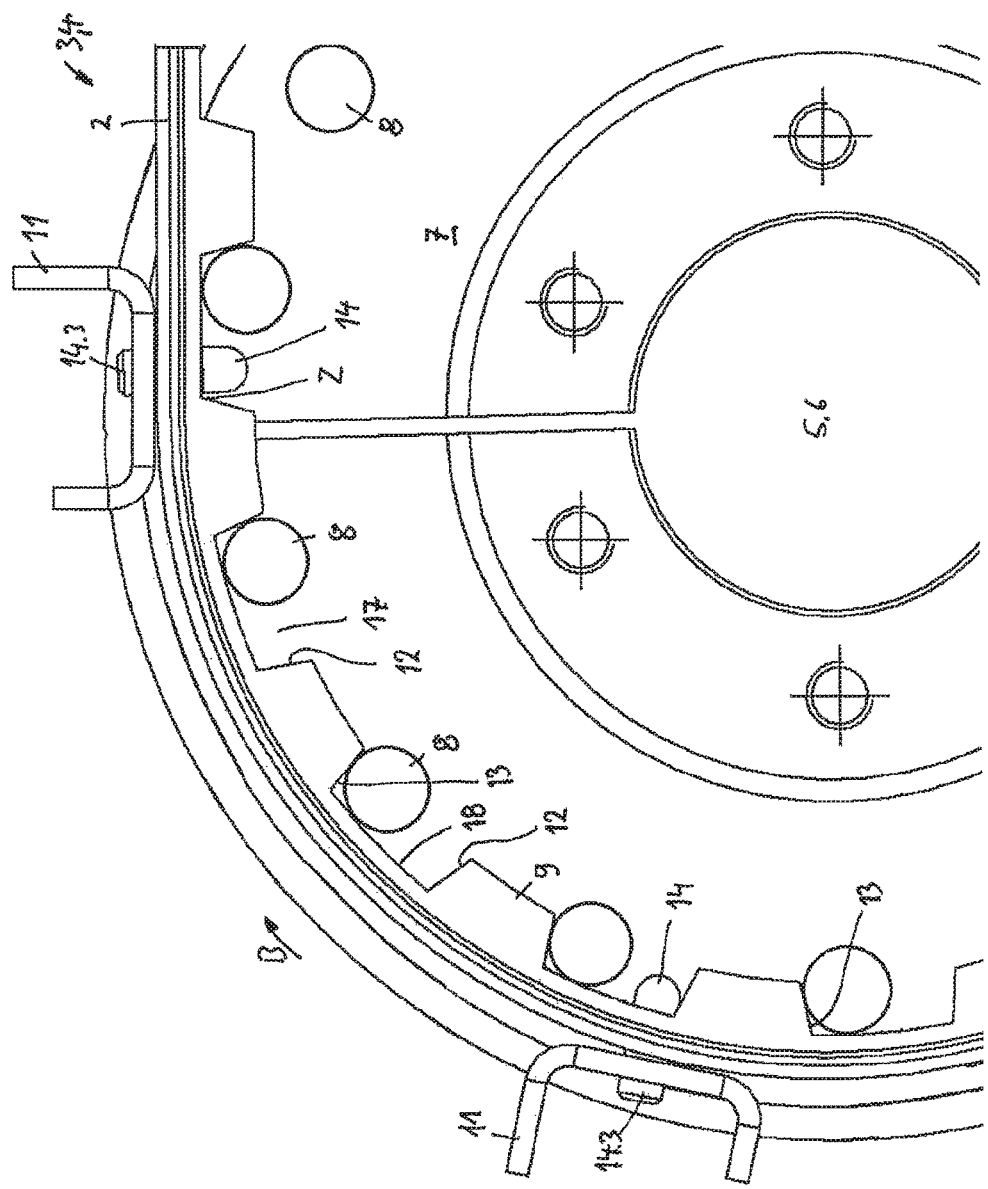
FIG. 7 shows an illustration according to FIG. 4 with a cam belt in a third embodiment.

FIG. 1 shows an inclined conveyor 1 for a combine harvester, having three cam belts 2 extending in parallel. The inclined conveyor conveys harvested crop in an undershot manner to a threshing unit of the combine harvester, not illustrated. The cam belts 2 are deflected via upper cam wheels 3 and lower cam wheels 4, which in this exemplary embodiment are designed as welded structures. A cast structure instead of a welded structure is also possible. The upper cam wheels 3 rest on a driven shaft 5, while the lower cam wheels 4, which rest on a shaft 6, are carried by the driven cam belts 2. The cam wheels 3 and 4 have a hub plate 7 that is connected in a rotatably fixed manner to the shafts 5, and carrier means or carriers 8 in the form of perpendicularly protruding cylindrical bolts 8 are welded at the circumference of the cam wheels.

In a first embodiment of the invention, the cam belts 2 have two types of cams: cams 9 or first cams 9 that are used solely for driving the cam belts 2 and cams 10 or second cams 10 that are additionally used for fastening functional elements or carrier strips 11 to the cam belts 2. The cams 9 have the cross section of an isosceles trapezoid, and based on the running direction of the cam belts 2, indicated in the figures by an arrow B, have a flank 12 or first flank 12 facing in the running direction and a flank 13 or second flank 13 facing in the opposite direction to the running direction B. Adjoining cams 9 are spaced apart from one another by gaps 17 in a predefined division, the gaps 17 being delimited by the flanks 12 and 13 and a base 18 which connects the two flanks 12, 13.

The cams 10 differ from the cams 9 in that in the former, in relation to the shape of cam 9, a front area C of second cams 10 is missing; i.e., the first flank 12', facing in the running direction (arrow B), of a second cam 10 is set back compared to the first flank 12 of a first cam 9, based on the running direction (arrow B) of the cam belt 2. This design is most apparent from the illustration according to FIG. 3, in which the stated front area C is indicated by dashed lines 16 for the cams 9 and 10. In addition, the flank 12' protrudes perpendicularly from the underside of the cam belt 2; i.e., protrudes perpendicularly relative to the cam belt 2, as shown. A cam 10 may be produced either by appropriate mechanical ablation of a cam 9 or by shaping during vulcanization.

Due to setting back the flank 12' or first flank 12' of second cam 10, facing in the running direction (arrow B), of a cam 10, space is provided in the interstitial area Z (i.e., a corner area Z) between the flank 12' and the base 18 of the gap 17 for situating a fastening means 14, illustrated in FIG. 2, without requiring more space than a cam 9. The fastening means or fastener 14 is a one-piece, U-shaped bracket made of rod steel. It has a base 14.1, which in the installed state forms a support element of the fastening means 14 on the cam belt 2. Two legs 14.3 which are provided with a thread 14.2 and are spaced apart from one another protrude perpendicularly from the base 14.1.

For mounting the fastening means 14 on the cam belt 2, two through holes 15 are situated in the interstitial area Z, and are spaced apart from one another by the same distance as for the legs 14.3 of the fastening means 14. During mounting, the fastening means 14 is inserted through the through holes 15 from below, so that the legs 14.3 protrude from the cam belt 2 on the outer side, as is apparent from the illustration according to FIGS. 3 and 4. The carrier strips 11 are subsequently pushed with their ends onto the protruding legs 14.3 of the fastening means 14, for which purpose they are provided with corresponding through holes. For establishing a screw connection, nuts, not illustrated, are then screwed onto the thread 14.2 of the legs 14.3 and tightened. As a result, the base 14.1 of the fastening means 14 is slightly retracted into the cam belt 2, as illustrated in FIG. 3, with enlargement of the support surface of the base.

The distance between the bolts 8 of the cam wheels 3 and 4 corresponds to the division of the cams 9, 10 of the cam belts 2. The bolts 8 therefore engage in a non-slip manner with the gaps 17 in the cam belt 2 that are formed between the cams 9 or between the cams 9 and 10.

Due to the described position of the fastening means 14, contact between the metal parts, namely, the bolts 8 of the cam wheels 3 and 4 and the fastening means 14, when the cam belt 2 circulates around the cam wheels 3 and 4, is avoided, as illustrated in FIG. 4. The cam belts 2 therefore run with very little noise and wear.

The exemplary embodiment described above is preferably used for cam belts 2 having a small division; in other words, the spacing between two adjoining cams is small, as will be readily understood. This also applies for the second exemplary embodiment according to FIGS. 5 and 6. This exemplary embodiment differs from the exemplary embodiment described above, in that the fastening means 14 is mounted with insertion of an angle plate 19, illustrated in FIG. 6, in between.

The angle plate 19 is made of sheet steel, and has a first face or cheek 20 and a second face or cheek 21 which enclose a right angle. The length of the angle plate 19 essentially corresponds to the width of the cam belt 2. In the installed state, the angle plate 19 is situated in the interstitial area Z, with the cheek 20 supported on the base 18 of a gap 17, and the cheek 21 supported on the perpendicular flank 12' of an adjoining cam 10, as is apparent from FIG. 5.

The cheek 20 is provided with two through holes 22 which have the same spacing as that between the two legs 14.3 of the fastening means 14. For mounting, the angle plate 19 is situated in the interstitial area Z in such a way that its through holes 22 align with the through holes 15 in the cam belt 2. During installation, the fastening means 14 is inserted through the aligned through holes 22 and 15 from below, so that the legs 14.3 protrude from the cam belt 2 on the outer side, as is apparent from FIG. 5. The carrier strips 11 are subsequently pushed with their ends onto the protruding legs 14.3 of the fastening means 14, for which purpose they are provided with corresponding through holes. For establishing a screw connection, nuts, not illustrated, are then screwed onto the thread 14.2 of the legs 14.3 and tightened.

The angle plate 19 has high rigidity due to its shape. As a result, the cheek 20 which rests on the base 18 of a gap 17 may be quite narrow, which fits the available space in the interstitial area Z. In principle, the cheek 20 need be no wider than the diameter of the fastening means 14; i.e., the through holes 22 may even open into the edge area of the cheek 20.

The angle plate 19 increases the resistance against the fastening means 14 being pulled through the cam belt 2 during installation and operation. Another advantage is that the cheek 21 is supported and thus stabilized due to shortening the somewhat diminished cam 10.

FIG. 7 shows another exemplary embodiment relating to a cam belt 2 having a large division. Here as well, a fastening means 14 as described above is used, which is situated in the interstitial area Z between the base 18 of a gap 17 and a flank 12, facing in the running direction (arrow B), of an adjoining cam 9. Since there is sufficient space for providing the fastening means 14 due to the large division in the interstitial area Z, shortening of the cam 9 is not necessary. In this embodiment as well, angle plates 19 as described above may be used, wherein the angle between the two cheeks 20 and 21 corresponds to the pitch angle of the flank 12, so that the cheek 21 rests against the flank 12 in the installed state.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A cam belt for agricultural machinery, the cam belt for agricultural machinery comprising:
   a) a polymer provided with reinforcement inserts, and having first and second cams, situated on the inner side of the belt, the first and second cams are used to drive the cam belt, and a first flank on the second cam facing in the running direction of the cam belt and a second flank on the second cam facing in the opposite direction to the running direction of the cam belt,
   b) the first and second cams are spaced apart from one another by gaps in a predefined division, and the gaps in each case are delimited by a first flank on the first cam and the second flank of the second cam of two adjoining first and second cams, the first flank of the first cam protrudes outwardly; the first flank of the second cam extends perpendicularly relative to the cam belt; and a second flank of the first cam protrudes outwardly, and the second flank of the second cam protrudes outwardly, and a base which connects the first flank on the first cam and the second flank of the second cam,
   c) during operation of the cam belt, carriers of a cam wheel, resting against the second flank of one of the two adjoining first and second cams and against the base of the gaps, engage with the gaps,
   d) on the outer side of the belt, carrier strips are fixed by a fastener which from the inner side of the belt passes through the cam belt and the carrier strips via at least one through hole, and the fastener is situated in the corner area between the first flank of the other of the two adjoining first and second cams and the base of the gaps.

2. The cam belt according to claim 1, wherein the fastener is installed in the corner area, with an angle plate inserted in between the fastener and the corner area, and the angle plate has a first face that is supported on the base of the gaps, and a second face that is supported on the first flank of the second cam.

3. The cam belt according to claim 1, wherein the fastener is a one-piece, U-shaped bracket made of rod steel, having a base which forms a support element and from which two legs, provided with a thread, protrude perpendicularly, and which two legs during installation are inserted through the at least one through hole in the cam belt.

4. A cam belt having an inner and an outer side, the cambelt comprising:
   a) a polymer provided with reinforcement inserts, and having first and second cams on the inner side of the belt, the first and second cams driving the cam belt, and a first flank on the second cam facing in the running direction of the cam belt and a second flank on the second cam facing in the opposite direction to the running direction of the cam belt;
   b) the first and second cams are spaced apart from one another by gaps in a predefined division, and each one of the gaps is delimited by a first flank on the first cam and the second flank of the second cam of two adjoining first and second cams, the first flank of the first cam protrudes outwardly; the first flank of the second cam extends perpendicularly relative to the cam belt; and a second flank of the first cam protrudes outwardly, and the second flank of the second cam protrudes outwardly, and a base which connects the first flank on the first cam and the second flank of the second cam;
   c) during operation of the cam belt, carriers of a cam wheel, resting against the second flank of one of the two adjoining first and second cams and against the base of the gaps, engage with the gaps;
   d) on the outer side of the belt, carrier strips are fixed by a fastener which from the inner side of the belt passes through the cam belt and the carrier strips via at least one through hole, and the fastener is situated in the corner area between the first flank of the other of the two adjoining first and second cams and the base of the gaps.

5. The cam belt according to claim 4, wherein:
a) the fastener is installed in the corner area.

6. The cam belt according to claim 4, wherein:
a) the fastener is installed in the corner area, with an angle plate inserted in between the fastener and the corner area, and the angle plate has a first face that is supported on the base of the gaps, and a second face that is supported on the first flank of the second cam.

7. The cam belt according to claim 6, wherein:
a) the fastener is configured as a one-piece, U-shaped bracket made of rod steel, having a base which forms a support element and from which two legs, provided with a thread, protrude perpendicularly, and which during installation are inserted through the at least one through hole in the cam belt.

8. The cam belt according to claim 5, wherein:
a) the fastener is a one-piece, U-shaped bracket made of rod steel, having a base which forms a support element and from which two legs, provided with a thread, protrude perpendicularly, and which during installation are inserted through the at least one through hole in the cam belt.

9. The cam belt according to claim 4, wherein:
a) the fastener is configured as a one-piece, U-shaped bracket made of rod steel, having a base which forms a support element and from which two legs, provided with a thread, protrude perpendicularly, and which during installation are inserted through the at least one through hole in the cam belt.

\* \* \* \* \*